US005505334A

United States Patent [19]

Triglia

[11] Patent Number: 5,505,334

[45] Date of Patent: Apr. 9, 1996

[54] TRASH CONTAINER LINER DISPENSING SYSTEM

[75] Inventor: Benito Triglia, Peekskill, N.Y.

[73] Assignee: Modern Technological Systems, Inc., Great Neck, N.Y.

[21] Appl. No.: 340,718

[22] Filed: Nov. 16, 1994

[51] Int. Cl.$^6$ .......... B65G 59/02

[52] U.S. Cl. .......... 221/199; 221/28; 221/46; 221/63; 221/66; 220/407; 220/408

[58] Field of Search .......... 221/22, 25, 26, 221/27, 28, 29, 33, 34, 46, 61, 63, 66, 92, 97, 199; 220/406, 407, 908

[56] References Cited

U.S. PATENT DOCUMENTS

| | | | |
|---|---|---|---|
| 3,451,453 | 6/1969 | Heck . | |
| 4,319,694 | 3/1982 | Nehrbass et al. | 220/407 |
| 4,349,123 | 9/1982 | Yang . | |
| 4,721,226 | 1/1988 | Yurko | 220/407 |
| 4,798,363 | 1/1989 | Cortesi . | |
| 4,850,507 | 7/1989 | Lemongelli et al. . | |
| 4,955,505 | 9/1990 | Battaglia . | |
| 5,031,793 | 7/1991 | Chen et al. . | |
| 5,100,051 | 3/1992 | Triglia et al. . | |
| 5,115,935 | 5/1992 | Lemongelli . | |
| 5,183,157 | 2/1993 | Darden . | |
| 5,295,607 | 3/1994 | Chang . | |
| 5,322,180 | 6/1994 | Ker . | |

*Primary Examiner*—William E. Terrell
*Assistant Examiner*—Dean A. Reichard
*Attorney, Agent, or Firm*—Nolte, Nolte and Hunter

[57] ABSTRACT

A storage rod for temporarily supporting liners for a container is mounted by one end of the rod to the bottom side of a wall having a slot for passing the liners through the wall from the bottom side to the top side of the wall. The attachment to the wall supports the rod with the other end of the rod unsupported for receiving the liners. The end of the rod receiving the liners is unobstructed, for access to the rod coaxially with the rod by a roll of liners for sliding them on the rod. A handle is at one end of the slot and generally normal to the slot to avoid uncontrolled twist of an operator's fingers when handling the assembly.

12 Claims, 4 Drawing Sheets

TRASH CONTAINER LINER DISPENSING SYSTEM

BACKGROUND OF THE INVENTION

1. Field of the Invention

The present invention relates to receptacles that supply flexible, separable liners for use in the receptacles, more specifically to a trash or garbage can which stores concatenated plastic bag liners below a false bottom of the can, the liners being fed through the false bottom into the can, in a system for rapid loading of the liners into storage, which accepts and feeds liners of various widths to the upper portion of the receptacle.

2. Description of the Prior Art

The art is replete with designs which temporarily store and deliver plastic bag liners to a trash container through a false bottom wall.

E. E. Heck, in U.S. Pat. No. 3,451,453, patented Jun. 24, 1969, discloses a horizontal wall spaced from the bottom wall of the container by a plurality of legs which rest on the bottom wall. A longitudinal slit in the horizontal wall is provided for passing the liners up in the container from below the horizontal wall. A pair of parallel, vertical walls, depending from the bottom of the horizontal wall, one on each side of the slot, parallel the slot. The parallel walls are spaced apart sufficiently to closely receive a roll of plastic bag liners or a box containing the roll.

At each end of this trough of parallel walls is a latch made by a curved member or by a pair of downward depending triangularly shaped walls with bottom lugs. The latches engage the bottom edges of the longitudinal ends of the roll or box in order to support the roll or box next to the horizontal wall between the time that the roll is loaded into the trough, and the time that the horizontal wall is set into the bottom of the container.

The latches are forcibly deflected back in order to load the roll into the trough. The latches predetermine the length of the roll or box.

In order to reload the trough with new bags or a box, the operator reaches into the container, inserts his or her fingers into the slot and withdraws the horizontal wall from the container. It is clear that a portion of the slot must be wide enough to accommodate the fingers, and the horizontal wall should be in balance or it could rotate about the slot during withdrawal and hurt the fingers.

The first bag from a new roll or box is fished through the slot from the bottom, and the roll or box is installed in the trough. The horizontal wall is then lowered into place on its legs, in the container. Holding the horizontal wall for lowering can be done by inserting one or more fingers in the slot, sharing the slot with the bag therein. The wall can be lowered by gripping the bag that is extending upward from the slot, but only if the weight of the wall and bags do not cause the bag to separate or pull additional bags through the slot.

U.S. Pat. No. 4,798,363, patented Jan 17, 1989 by Roy L. Cortesi, discloses a waste basket with a recessed bottom which forms a cavity in the underside of the basket. The roll of plastic bags is mounted on a spring-loaded telescoping spindle which is journaled at each end in bosses in opposite side-walls of the cavity.

The bags pass up through a slot in the bottom of the basket. In order to install a roll of bags, the basket is inverted, the empty spindle is removed by compressing the spring, a new roll of bags is placed on the spindle, and it is replaced in the bosses.

U.S. Pat. No. 4,955,505 patented Sep. 11, 1990 by Michael A. Battaglia discloses a trapezoidal, open bottom, base, having a slit in the top for passing bags from within the base through the top and into a basket mounted on or over the base.

The bags are stored on a spindle which is journaled at each end in sockets in opposite side walls of the base. The wider bottom ends of the base fit on a flat, weighted base to add stability to the assembly. A foot-operated brake comprising a pivoted board can be made to press against the roll when one wishes to pull on a bag to separate it from one below that is on the roll.

In order to replenish the spindle with bags, the base is separated from the basket and from the weighted base, and is inverted. The spindle is removed, loaded, and installed in the sockets by flexing the side walls of the base. Alternatively, the spindle may be a telescoping spring-loaded design. The trapezoidal base is then uprighted and attached to the weighted base and to the basket.

Chen et al., in U.S. Pat. No. 5,031,793, patented Jul. 16, 1991, discloses a hinged, false bottom, slotted wall, which rotates upward upon hinges attached to one inner wall of the basket. When the wall is rotated upward, it reveals a hollow base having three adjacent parallel troughs.

The center trough holds the roll of plastic bags. Another of the troughs holds deodorant, and the third trough holds a waste container for receiving waste water drippings from the litter in the basket on the chance that there is leakage past the bag.

The hinged wall has two slots, one positioned over the center trough for passing the bag up into the basket, and the other slot positioned over the waste water trough for directing drippings into that trough.

In order to restock the trough with plastic bags, the operator must work within the basket. Reaching into the basket, the operator rotates the hinged wall upward. Reaching further down into the basket, the operator inserts a new roll in the center trough and grips the waste water container, and being careful not to tilt it, draws it up and out of the waste basket and empties it. Reaching back into the container, the operator returns the waste water container to the trough, draws a first bag up from the roll and fishes or threads the first bag through the slot, and rotates the hinged wall down.

SUMMARY OF THE INVENTION

It is one object of the invention to provide a trash can liner dispensing system which can be removed from the trash can without injuring the operator's fingers.

It is another object of the invention that loading of the system with new bags can be done outside of the trash can.

It is another object that the system can be loaded with, and will feed to the trash can, bags of various widths.

It is another object that the bags can be loaded into the system independently of the walls of the trash can.

It is another object that the bags can be loaded onto the system without having to align ends of a shaft into journaled walls.

Other objects and advantages will become apparent from reading the ensuing description of the invention.

In the present invention, a first wall has a first slot through the wall for passing a liner bag from the bottom to the top of the wall.

A storage rod having a length and diameter suitable for holding a plurality of liners is attached directly to the first wall by attachment means which spaces the plurality of liners on the storage rod from the first wall and orients the storage rod parallel with the first slot.

The first end of the storage rod is for receiving a plurality of liners for holding them on the storage rod. The first end of the storage rod is unsupported and the second end of the storage rod is attached to the first wall for supporting the rod for receiving the liners over the first end.

A second slot in the first wall is located at one end of the first slot and is generally normal to the first slot, for holding the system.

A plurality of walls or legs extend from the bottom of the first wall for spacing the liners on the storage rod from a surface upon which the system rests when the system is supported on the surface by the plurality of walls.

An opening in the plurality of walls comprises access to the free end of the storage rod for passing, coaxially with the storage rod, a roll of liners through the opening for sliding the roll on the storage rod from the first end of the storage rod.

BRIEF DESCRIPTION OF THE DRAWINGS

In order that the invention be more fully comprehended, it will now be described, by way of example, with reference to the accompanying drawings in which.

DESCRIPTION OF THE PREFERRED EMBODIMENTS

Figure 1:
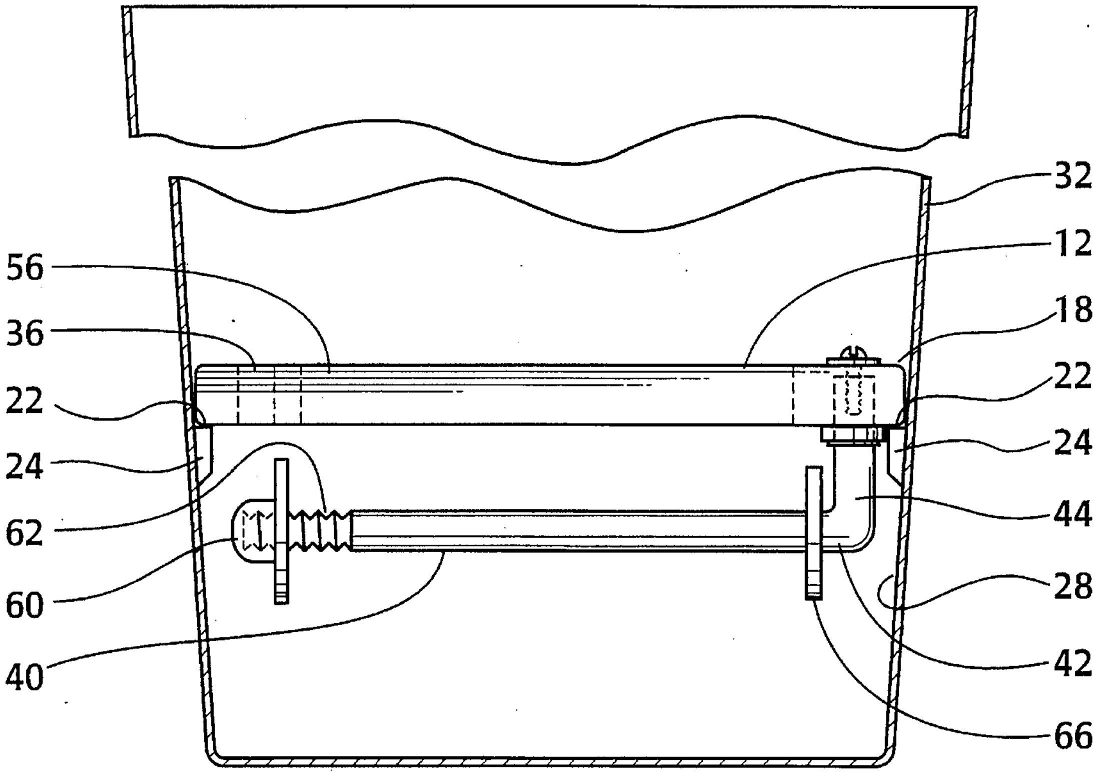
FIG. 1 is a schematic front view of a trash container liner system according to the present invention, installed in a trash container.

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

Figure 2:
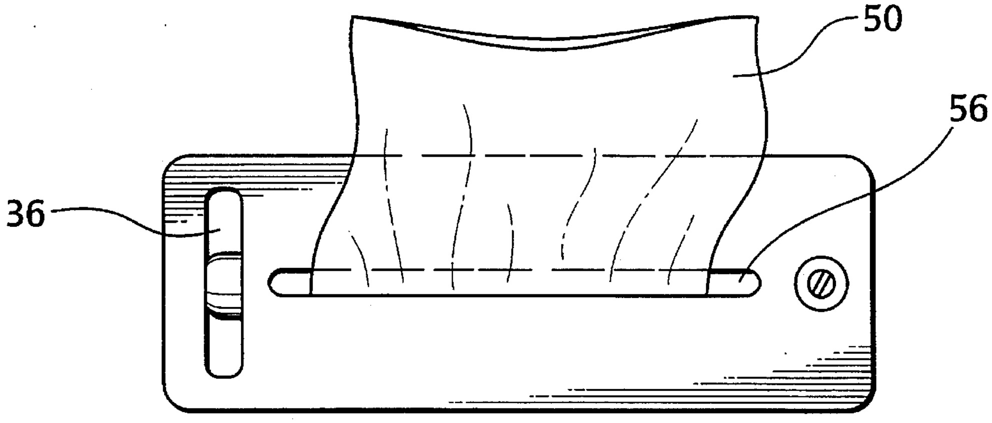
FIG. 2 is a top view of the system with a liner.

Referring to FIGS. 1 and 2, wall 12 of liner dispensing system 18 rests by outer edges 22 on support projections 24 of inner wall 28 of trash container 32.

Wall 12 includes hand slot 36 for lifting system 18 up and out from container 32. Slot 36 is displaced from the center of wall 18, making the direction of rotation of wall 12 about slot 36 as the wall is lifted, predictable. The operator uses the predictability to avoid twisting injury to fingers or hand, and to help guide wall 12 outer edges 22 onto support projections 24 when reinstalling the system in the container.

Figure 3:
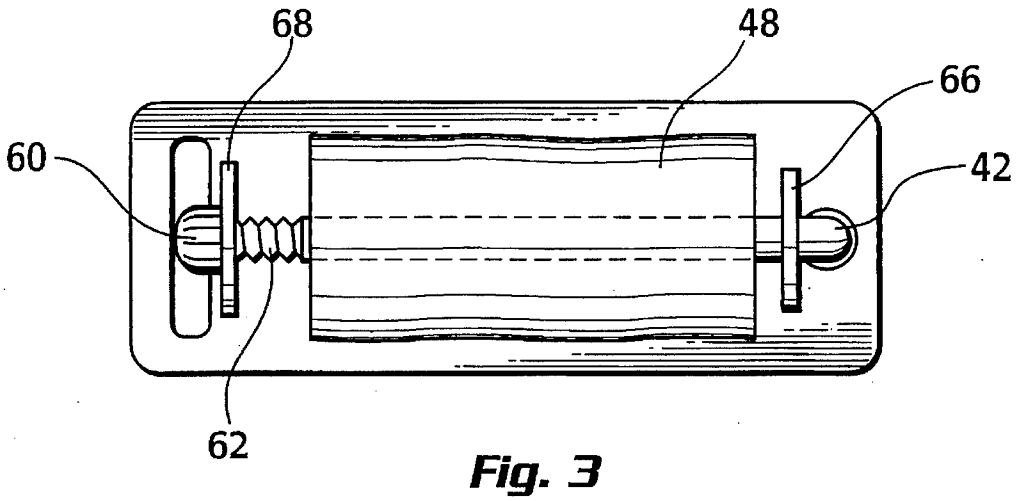
FIG. 3 is a bottom view of the system loaded with a roll of plastic bag liners.

Storage shaft 40 is generally parallel to wall 12, and attached at mounting end 42 of the shaft to wall 12 by angle bracket 44 which spaces shaft 40 sufficiently from wall 12 to permit storing a roll 48 of plastic bags on shaft 40 as shown in FIG. 3, without interference from wall 12.

Referring to FIGS. 1–4, the first, outer bag 50 on the roll passes through feeder slot 56 which is of specific shape and width to guide the bag and preferably to offer slight resistance to movement of the bags. This makes it easier to separate the first bag from the following, second bag 52 by tearing at the perforations 54 between the bags without accidentally drawing many bags through the slot. As the feed slot is not used for another purpose it can be tailored to control bag passage.

In order to load new bags onto the present invention's trash container liner dispensing system, wall 12 is lifted out of container 32 by gripping the wall through hand slot 36.

Screw-on retainer cap 60 is unscrewed from the unsupported or free end 62 of shaft 40. A new roll 48 of bags is slipped on the shaft from the free end, and moved along the shaft preferably until the roll comes to a stop against limit disk 66.

Retainer cap 60 is screwed on to the free end of retainer shaft 40 so that limit disk 68 of retainer cap 60 prevents roll 48 from leaving the shaft at free end 62.

The first bag 50 is fished through feed slot 56. Wall 12 is then placed back in the container, onto support projections 24.

The first bag is pulled up sufficiently to line the container. This usually results in pulling a small portion of the second bag into the container where it remains under the first bag until the first bag is full. The second bag is then available to draw upon to replace the first bag as liner of the container.

Figure 4:
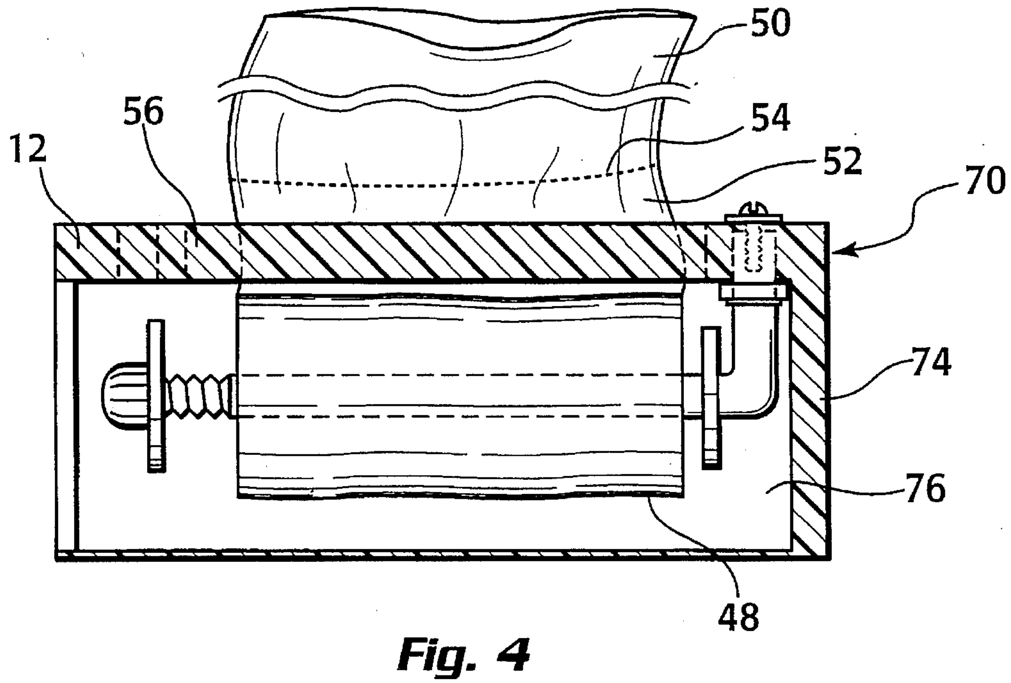
FIG. 4 is a front view of another embodiment of the invention taken along lines 4—4 of FIG. 5.
Figure 5:
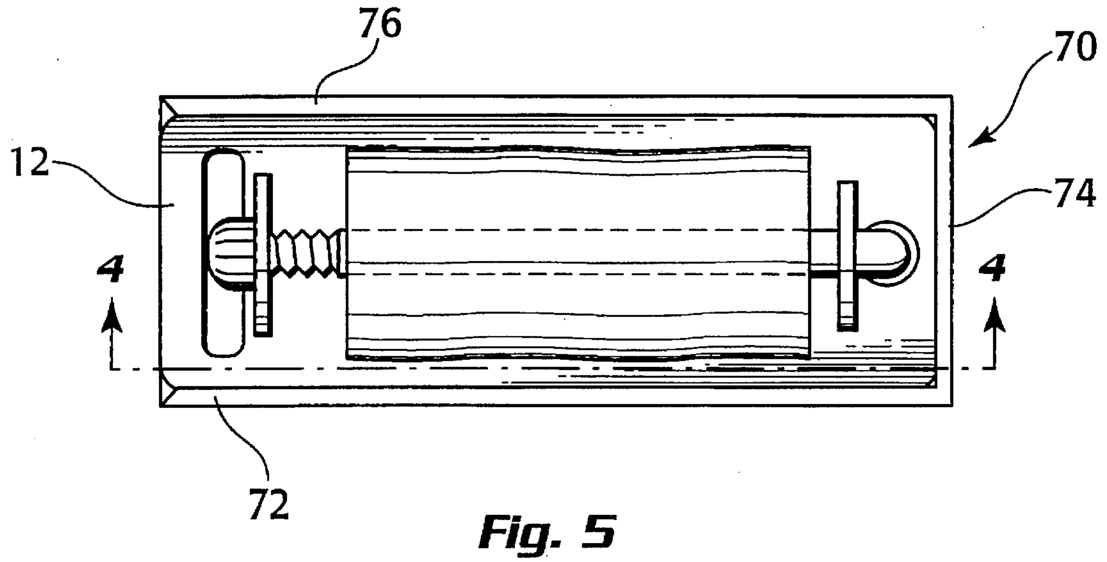
FIG. 5 is a bottom view of another embodiment of the invention.

In system 70 shown in FIGS. 4 and 5, wall 12 has spacer walls 72, 74 and 76, for supporting the system on the bottom of a container. This permits use of system 70 in a container which does not have support projections 24. There is no wall or obstruction adjacent the free end of the storage shaft 40 which provides access to the free end of the shaft to load a roll of bags and to unload the empty mandril when the supply of bags is exhausted.

Figure 6:
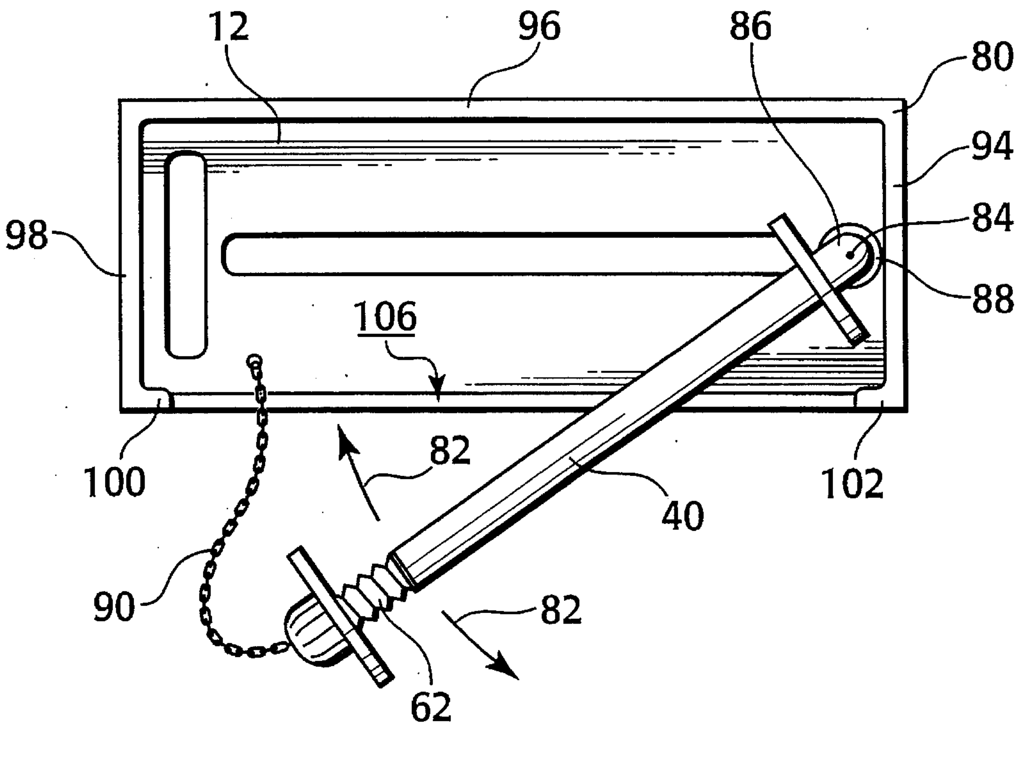
FIG. 6 is a bottom view of another embodiment of the invention.

Referring now to FIG. 6, storage shaft 40 of system 80 can be rotated over and away from wall 12 as shown by arrows 82, about axis 84 that is generally normal to wall 12, for convenient loading from free end 62, of a roll of bags. Shaft 40 is supported for the rotation by angle bracket 86 which is held by and rotates within bearing 88.

A chain or other cap retention means 90 is provided to keep the cap available during liner change. The attachment of the cap retention means to the cap is designed to permit manipulation of the cap as it is rotated or snapped on free end 62 of shaft 40. Spacer walls 94, 96 and 98, 100 and 102 support system 80 on the bottom of the container. An opening between walls 100 and 102 is wide enough to pass shaft 40 fully loaded with bags.

It should be understood that the spacer walls in the present invention may be any width and need not be attached directly to one another, as in individual legs, as long as they support the system as described.

Figure 7:
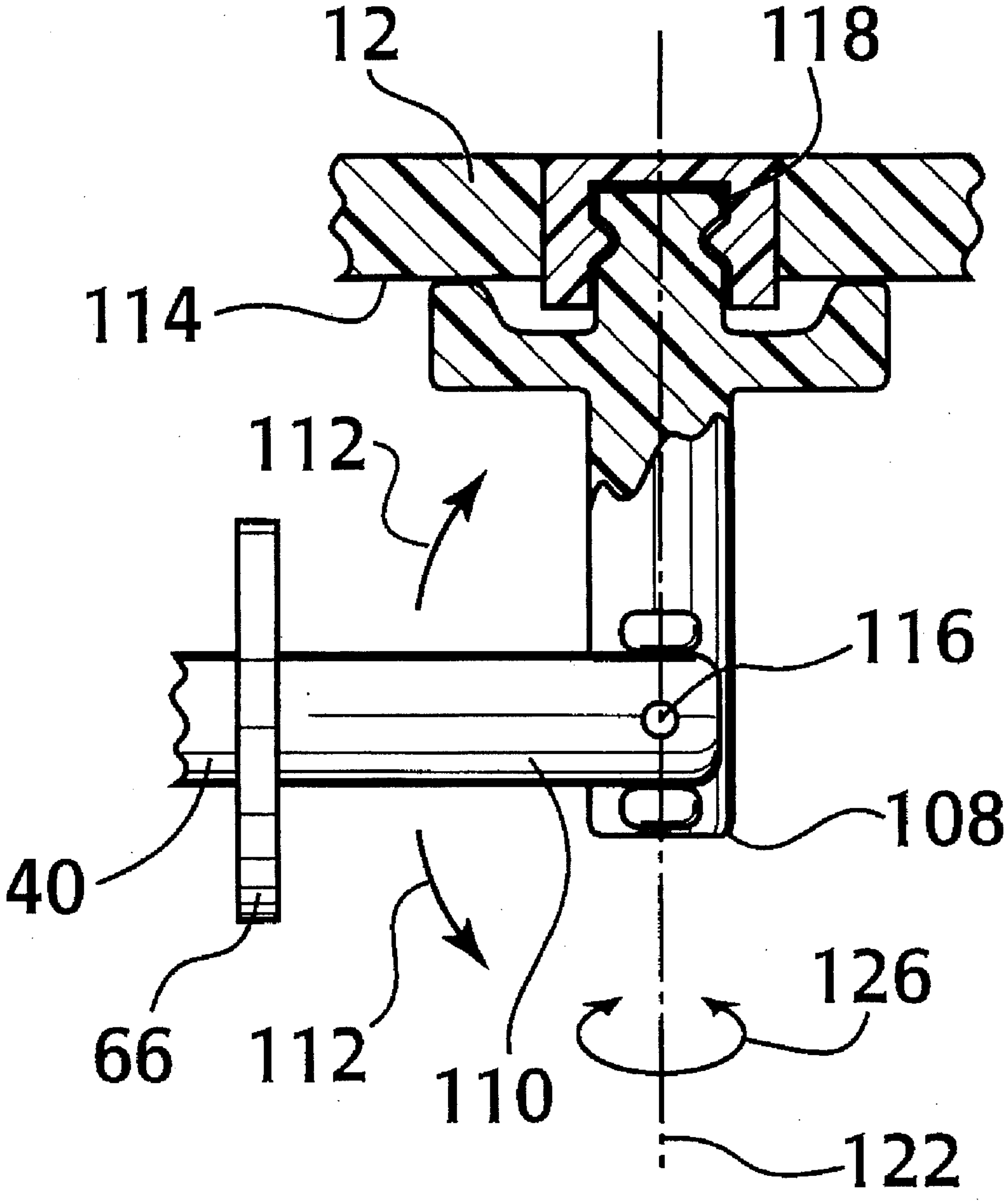
FIG. 7 is a front view of a portion of another embodiment of the invention.

In FIG. 7, angle bracket 108 of another system of the present invention includes pivot arm 110 for pivoting storage shaft 40 normally on axis pin 116, from the bottom 114 of wall 12 as shown by arrows 112. Angle bracket 108 is removably mounted in wall 12 by snap-fit fitting 118, and allows bracket 108 to be rotated about axis 122 as shown by arrows 126. This provides the operator with several options for accessing the free end of storage shaft 40 for loading on a roll of bags.

Although the present invention has been described with respect to several embodiments thereof, it is to be understood that the scope of the invention is not limited by that description. It will be obvious to those skilled in the art that various modifications and substitutions may be made without departing from the spirit and scope of the invention which shall be limited only by the following claims.

I claim:

1. A liner dispensing system for a container, said system comprising:

a first wall having a top and a bottom, a first slot in said first wall, said slot being a passageway through said first wall for passing a liner bag from the bottom to the top of said first wall, storage rod means having a first end and a second end and having a length and diameter suitable for holding a plurality of liners on said storage rod means, means for attaching said second end of said storage rod means directly to said first wall by said means for attaching, said means for attaching spacing said storage rod means from said first wall sufficiently to space the plurality of liners on said storage rod means from said first wall, and orienting said storage rod means parallel with said first slot, said first end being a free end for receiving said plurality of liners over said first end for holding said plurality of liners on said storage rod means, said first end of said storage rod means being unsupported and said second end of said storage rod means being attached by said means for attaching to said first wall for supporting said storage rod means for said receiving of said plurality of liners over said first end.

2. The liner dispensing system described in claim 1, further comprising:

a second slot in said first wall, said second slot being a hand hold for receiving fingers through said first wall.

3. The liner dispensing system described in claim 2, further comprising said second slot being generally normal to, said first slot.

4. The liner dispensing system described in claim 3, further comprising:

said second slot being at one end of said first slot, and closer to said first end than said second end of said storage rod means.

5. The liner dispensing system described in claim 1, further comprising:

a plurality of walls extending from the bottom of said first wall for spacing said liners on said storage rod means from a surface upon which said system rests when said system is supported on said surface by said plurality of walls.

6. The liner dispensing system described in claim 5, further comprising:

said storage rod means comprising an axis, an opening in said plurality of walls comprising access to said free end of said storage rod means for passing coaxially with said storage rod means a roll of liners through said opening for sliding said roll on said storage rod means from said first end.

7. The liner dispensing system described in claim 1, further comprising:

first pivot means on said means for attaching, for rotating said storage rod means out of parallel with said first slot when said storage rod means is attached to said first wall by said means for attaching.

8. A liner dispensing system for a container, said system comprising:

a first wall having a top and a bottom a first slot in said first wall, said slot being a passageway through said first wall for passing a liner bag from the bottom to the top of said first wall, storage rod means having a first end and a second end and having a length and diameter suitable for holding a roll of a plurality of liners about an axis on said storage rod means, means for attaching said second end of said storage rod means directly to the bottom of said first wall by said means for attaching, said means for attaching spacing said storage rod means from said first wall sufficiently to space the plurality of liners on said storage rod means from said first wall, and orienting said storage rod means parallel with said first slot, said first end of said storage rod means being a free end and accessible for sliding said roll of liners on said storage rod means from said first end when the second end of said storage rod means is attached to said first wall.

9. The liner dispensing system described in claim 8, further comprising:

a second slot in said first wall, angled from parallel with said first slot, said second slot being a hand hold for receiving fingers through said first wall.

10. A liner dispensing system for a container, said system comprising:

a first wall having a top and a bottom, a first slot in said first wall, said slot being a passageway through said first wall for passing a liner for said container, from the bottom to the top of said wall, a rod having an elbow bend in said rod, a first end at a straight portion of said rod on one side of said elbow bend, and a second end on the other side of said elbow bend, said second end being attached to the bottom of said first wall, said first end being free, said straight portion being generally parallel to said slot and comprising means for receiving a plurality of liners by way of said first free end for temporarily storing on said rod said plurality of liners for said container for passing said liners through said slot into said container.

11. The liner dispensing system described in claim 10, further comprising:

handle grip means being longer than wide, lengthwise being generally normal to and at one end of said first slot for gripping said first wall.

12. The liner dispensing system described in claim 10, further comprising:

said attachment of said second end to said first wall being sufficiently strong to support said straight portion with said liners spaced from said first wall when said straight portion is receiving said plurality of liners by way of said first end.

* * * * *